(12) United States Patent
Batni et al.

(10) Patent No.: US 8,982,874 B2
(45) Date of Patent: Mar. 17, 2015

(54) METHOD AND APPARATUS FOR PROVIDING CUSTOMIZED RING BACK TO CALLING TERMINALS IN A CABLE NETWORK

(75) Inventors: Ramachendra P. Batni, Phoenix, AZ (US); Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 2768 days.

(21) Appl. No.: 11/384,147

(22) Filed: Mar. 17, 2006

(65) Prior Publication Data

US 2007/0217398 A1    Sep. 20, 2007

(51) Int. Cl.
*H04L 12/26* (2006.01)
*H04L 29/06* (2006.01)
*H04M 3/42* (2006.01)

(52) U.S. Cl.
CPC ..... *H04L 29/06027* (2013.01); *H04M 3/42017* (2013.01); *H04L 65/1006* (2013.01); *H04L 65/1083* (2013.01)
USPC .......................................................... 370/352

(58) Field of Classification Search
CPC ................... H04L 29/06027; H04L 65/1006; H04L 65/1083; H04M 3/42017
See application file for complete search history.

(56) References Cited

U.S. PATENT DOCUMENTS

| 7,613,287 | B1* | 11/2009 | Stifelman et al. | 379/215.01 |
| 2004/0081304 | A1* | 4/2004 | Lee | 379/207.04 |
| 2005/0117726 | A1* | 6/2005 | DeMent et al. | 379/142.01 |
| 2007/0172034 | A1* | 7/2007 | Jung | 379/1.01 |
| 2007/0201484 | A1* | 8/2007 | Kenrick et al. | 370/395.5 |
| 2007/0291931 | A1* | 12/2007 | DeMent | 379/418 |

* cited by examiner

*Primary Examiner* — Luat Phung
(74) *Attorney, Agent, or Firm* — Carmen Patti Law Group, LLC

(57) ABSTRACT

In an apparatus and method, one method example has the steps of: placing a call from a calling terminal to a called terminal in a cable telecommunication network, and communicating with a ring back application; initiating a new call by the ring back application to the called terminal via a call management server; ringing the called terminal by the call management server and providing an indication of the ringing to the ring back application; and sending, by the ring back application, a predetermined ring back signal to the calling terminal. Upon answer by the called party, the ring back application informs the calling party end device of the called party's address, and upon receiving the acknowledgement from the calling party's end-device it stops the predetermined ring back signal and informs the called party end device to cut thru the bearer path to the calling party's device. Finally, upon call termination by one of the parties, the application facilitates the tear down of the call by relaying the appropriate messages between the equipment involved in the call between the calling and called parties.

23 Claims, 5 Drawing Sheets

US 8,982,874 B2

METHOD AND APPARATUS FOR PROVIDING CUSTOMIZED RING BACK TO CALLING TERMINALS IN A CABLE NETWORK

RELATED APPLICATION

This application is related to U.S. patent application Ser. No. 11/027,298 entitled "Method and Apparatus for Providing Multimedia Ringback Services to Mobile User Devices in Pre-IMS Networks".

This application is related to U.S. patent application Ser. No. 11/026,509 entitled "Method and Apparatus for Providing Multimedia Ringback Services to User Devices in IMS Networks".

This application is related to U.S. patent application Ser. No. 11/290,288 entitled "Method and Apparatus for Providing Customized Ringback to Calling Party Devices in an IMS Network".

BACKGROUND

This invention relates to telecommunication networks and, more specifically, to providing ring back services to user devices in a cable network.

In a traditional wireline or wireless telephone system, ring back is the audio sound sent by a switch to the telephone of the calling party prior to call path connection to a called party. Such traditional ring back consisted of periodic tones used to convey to the calling party that the telephone of the called party was ringing.

Because an Internet Protocol (IP) Multimedia Sub-System (IMS) utilizes packet networks instead of traditional wireline circuit-based networks, ring back has to be generated and provided by other than a telecommunication switch. A known method of generating the ring back tones is local generation of the tones at the calling party equipment, upon receiving an appropriate signal from the network; however, the end-user's experience in such cases is limited to experiencing from one of the finite pre-stored ring back tones on the end-user device. Another known method of providing ring back in an IMS uses a Session Initiation Protocol (SIP) "Alert-Info" messaging. This functions as a client pull technique where the calling party is the client and the IMS is the network from which the ring back information is pulled by the client.

However, methods of providing ring back in an IMS network may not be directly applied for use in a cable network. With the increasing use of cable networks for telephone type services, there is thus a need in the art for an implementation of customized ring back in cable networks.

SUMMARY

The invention in one implementation encompasses an apparatus. The apparatus in one embodiment may comprise: means for placing a call from a calling terminal to a called terminal in a cable telecommunication network, and communicating with a ring back application; means for initiating a new call by the ring back application to the called terminal via a call management server; means for ringing the called terminal by the call management server and providing an indication of the ringing to the ring back application; and means for sending, by the ring back application, a predetermined ring back signal to the calling terminal.

The invention in a further implementation encompasses a method. The method in one embodiment may comprise: placing a call from a calling terminal to a called terminal in a cable telecommunication network, and communicating with a ring back application; initiating a new call by the ring back application to the called terminal via a call management server; ringing the called terminal by the call management server and providing an indication of the ringing to the ring back application; and sending, by the ring back application, a predetermined ring back signal to the calling terminal.

DESCRIPTION OF THE DRAWINGS

Features of implementations of the present method and apparatus will become apparent from the description, the claims, and the accompanying drawings in which:

DETAILED DESCRIPTION

Figure 1:
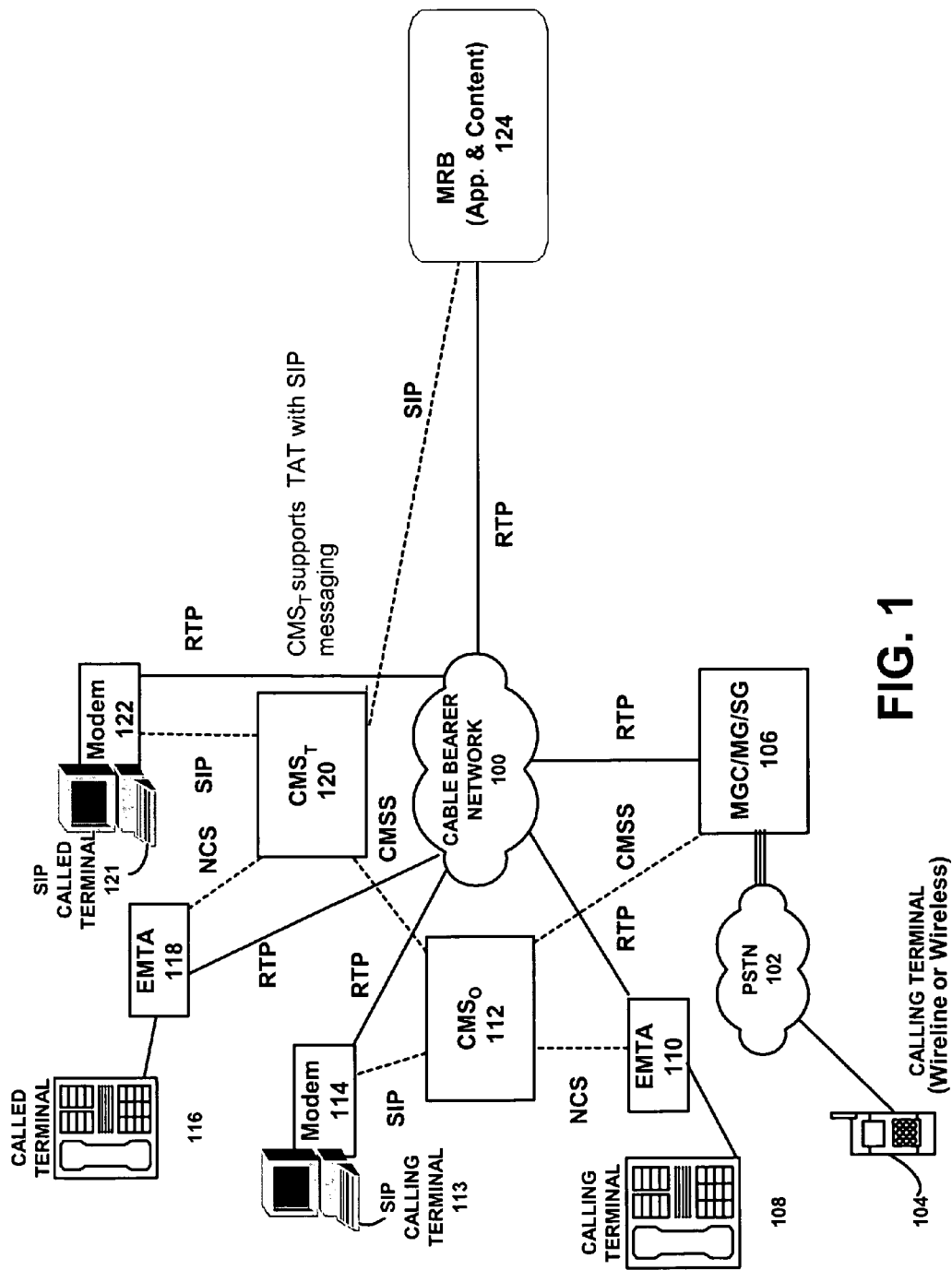
FIG. 1 is a block diagram of an exemplary telecommunication system suited for incorporating an embodiment of the present apparatus.
Figure 2:
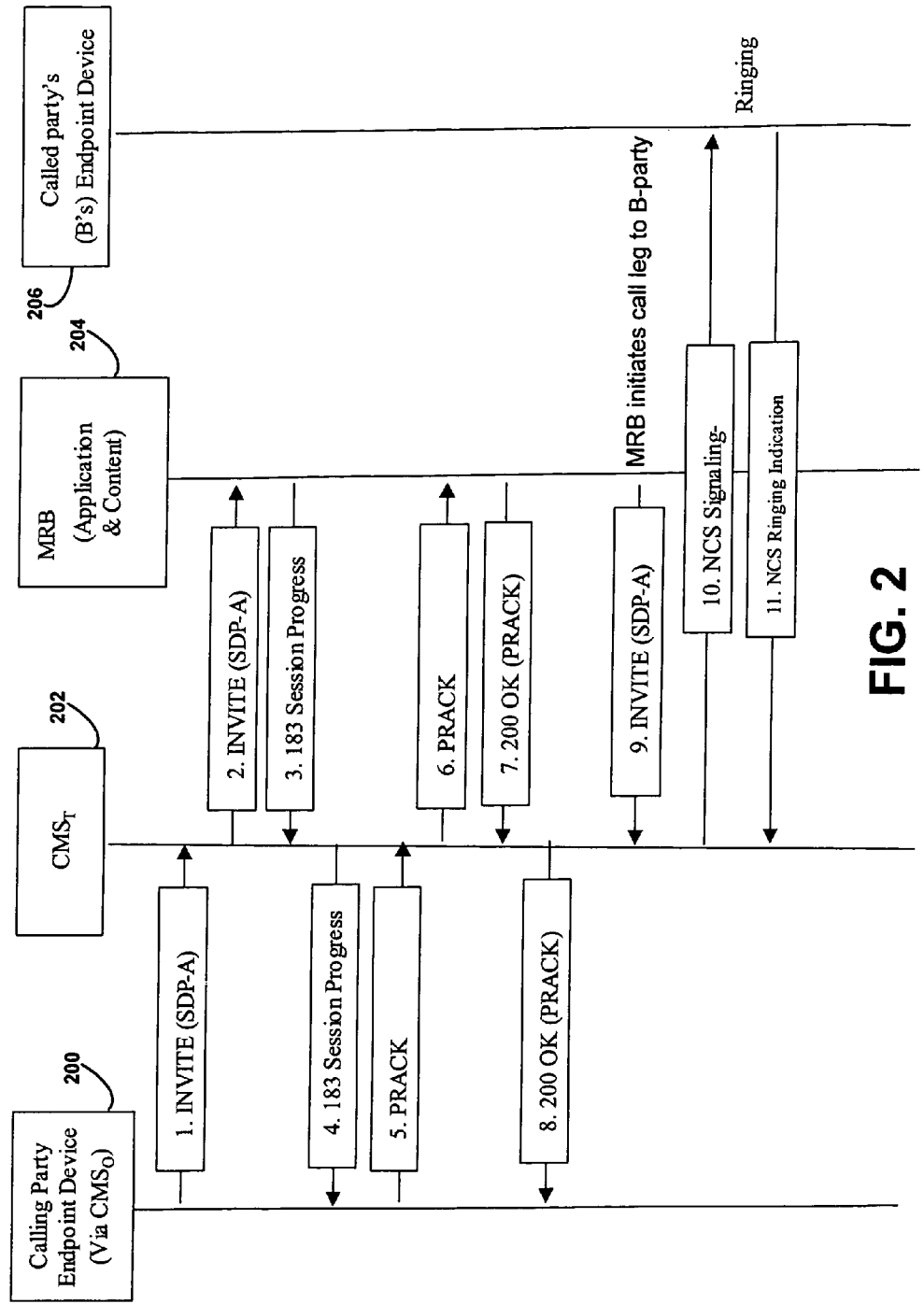
FIG. 2-5 are signal flow diagrams of an exemplary method according to an embodiment of the present method.
Figure 3:
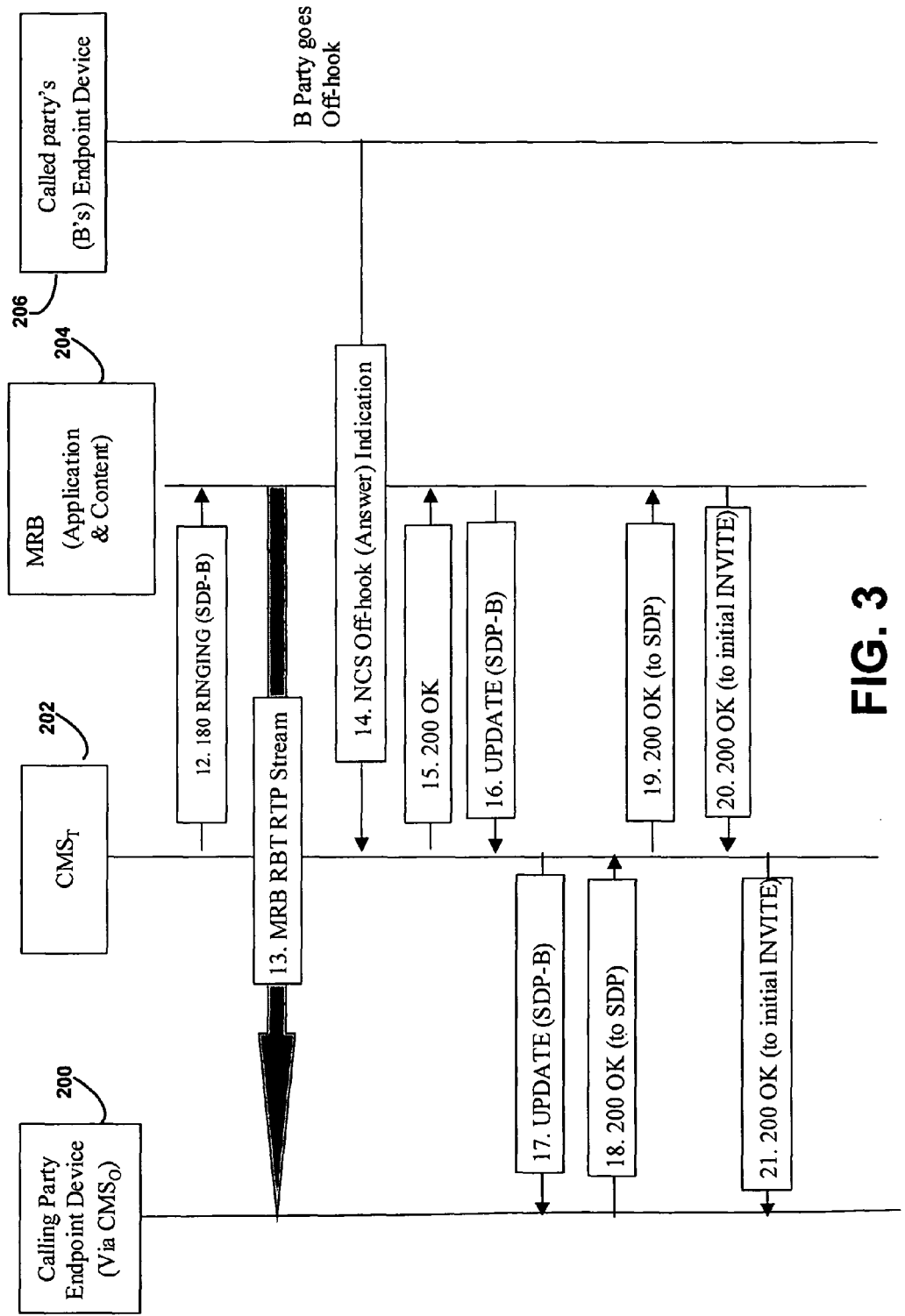
Figure 4:
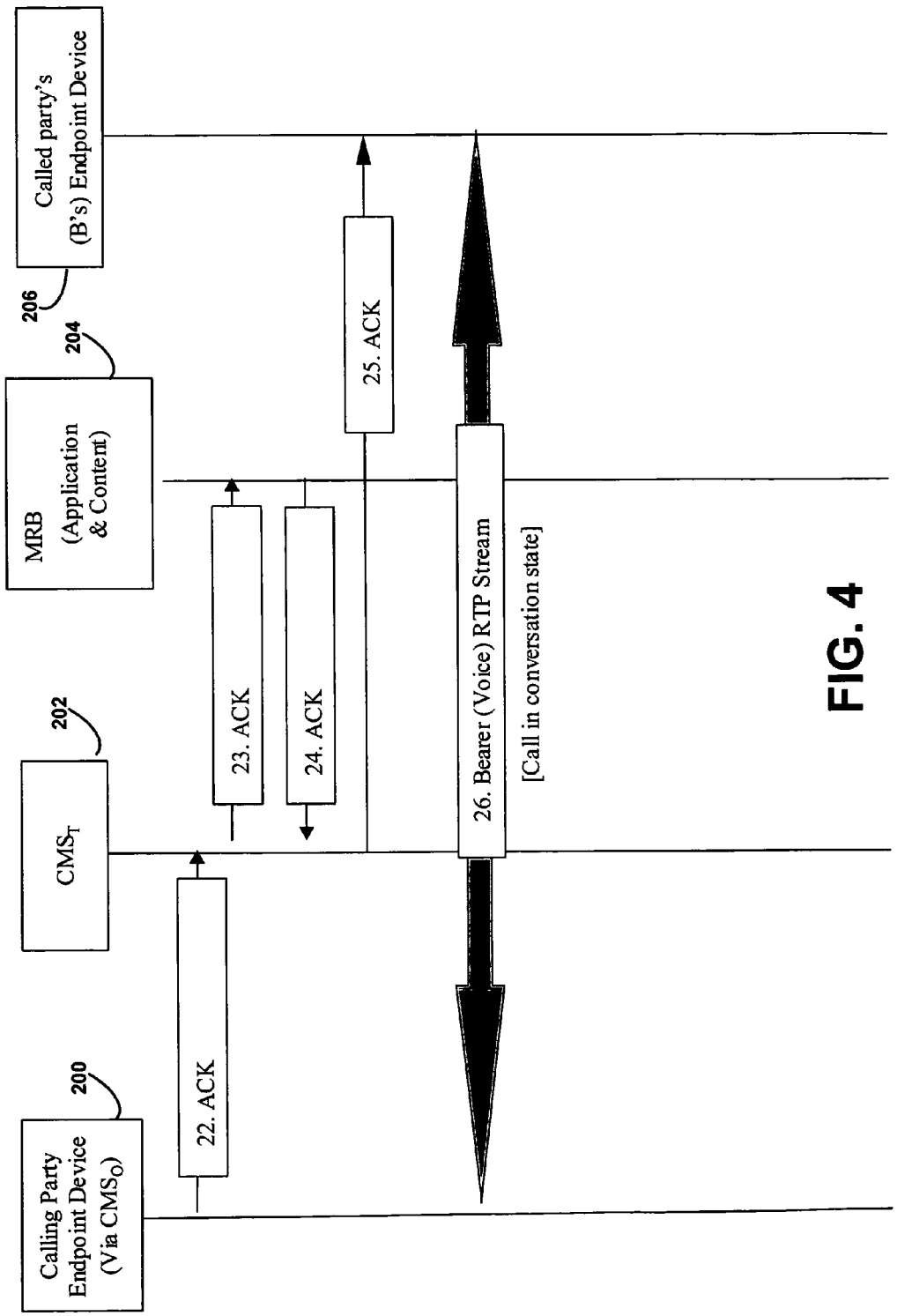
Figure 5:
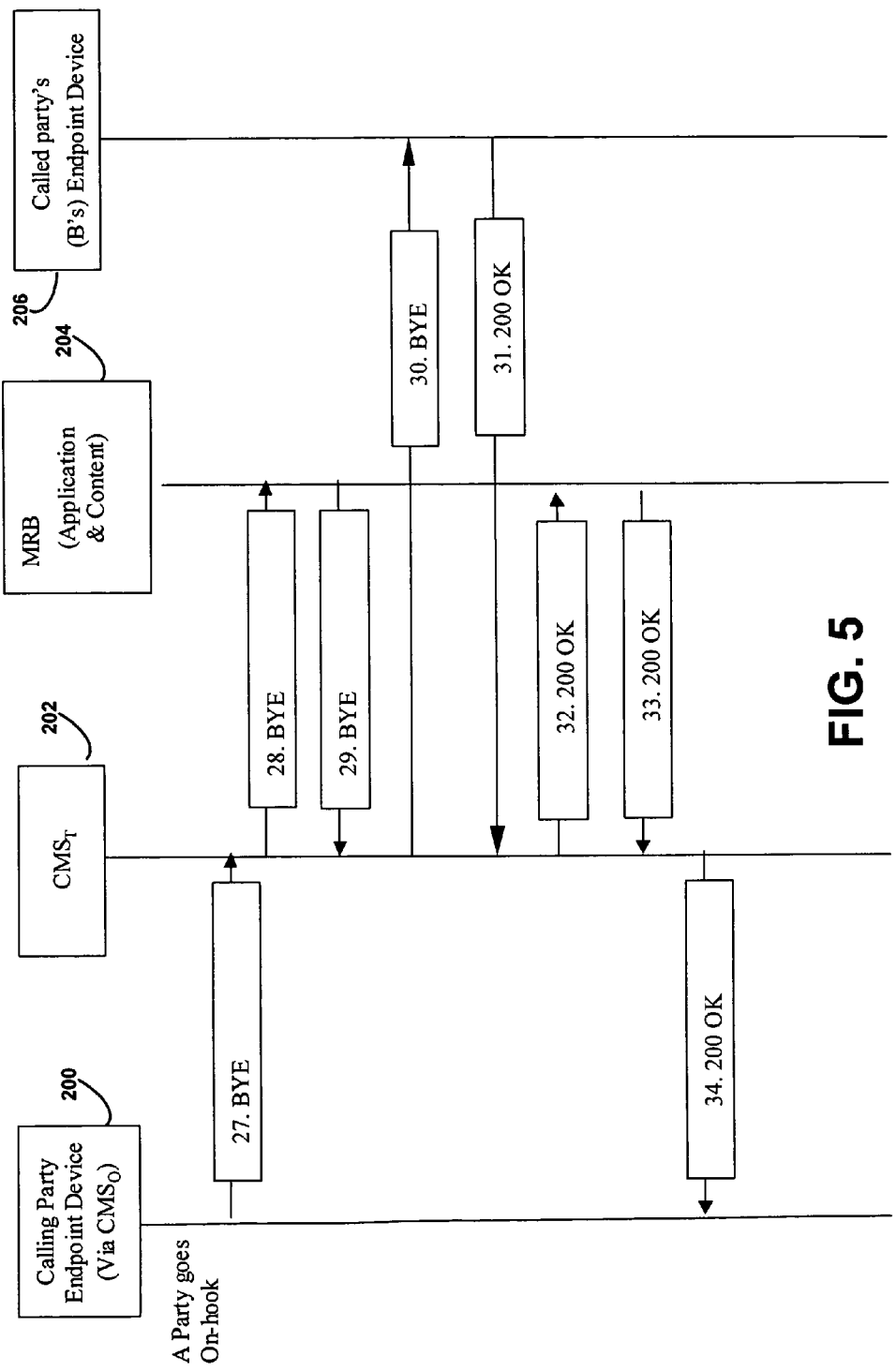

The following terminology is used herein:
CMS call management server
CMSS CMS to CMS signaling
$CMS_O$ call management server, originating
$CMS_T$ call management server, terminating
eMTA enhanced multimedia terminal adapter
MG media gateway
MGC media gateway controller
MRB ring back procedures such as MiRingBack by Lucent Technologies
MTA multimedia terminal adapter
NCS network call signaling
RTP real time protocol (A transport protocol for real-time applications as specified in IETF RFC 1889)
SDP session description protocol (IETF RFC 2327)
SG signaling gateway
SIP session initiation protocol (IETF RFC 3261)
TAT termination attempt trigger FIG. 1 shows a cable telecommunications system including a cable network 100 that may be operatively coupled to a public switched telephone network (PSTN) 102. A wireline or wireless communication device 104 may be operatively coupled to the cable network 102 via, for example, the PSTN network 102, and a MGC(media gateway controller)/MG (media gateway)/SG(signaling gateway) 106.

In the example depicted in FIG. 1, a calling terminal may be a wireline station 108 operatively coupled to the cable bearer network 100 via an eMTA 110. The calling terminal may also be a SIP terminal 113 operatively coupled to the cable bearer network 100 via a modem 114. The calling terminal may also be the wireline or wireless communication devices 104. Similarly, a called terminal may be any type of user end-device 116 operatively coupled to the cable bearer network 100 via an eMTA 118. The called terminal may also be a SIP terminal 121 operatively coupled to the cable bearer network 100 via a modem 122.

The eMTA 110 and the modem 114 may be operatively coupled to a $CMS_O$ 112. The $CMS_O$ 112 may be operatively coupled to the MGC(media gateway controller)/MG(media gateway)/SG(signaling gateway) 106, and to a $CMS_T$ 120. The eMTA 118 and the modem 122 may also be operatively coupled to a $CMS_O$ 112.

A MRB 124 may be operatively coupled to the cable bearer network 100.

Various access networks may be operatively coupled to the cable network. Such access networks may comprise a 3G wireless network such as supporting wideband code division multiple access (WCDMA), universal mobile telecommunications system (UMTS), code division multiple access (CDMA) 2000, a CDMA 2000 evolution data only (EvDO) system, a public switched telephony system (PSTN), an integrated services digital network (ISDN), and other such systems.

Terminals or end-user devices may comprise communication devices of telecommunications subscribers that can initiate and/or receive calls. Such end-user devices may comprise wireless communication devices such as cellular telephones, personal digital assistants, computers with wireless modems, etc. as well as wireline communication devices such as traditional telephones, IP telephones, SIP telephones, and computers and/or personal digital assistants connected by wireline.

FIGS. 2-5 depict a signal diagram of an embodiment according to the present method in which predetermined digital information, e.g. digitally stored audio, is provided to the calling party instead of conventional ring back tones. The following described predetermined ring back signals may be audio, video, text and/or image, i.e., the signal content can be multi-media and NOT limited to only an audio stream. The signal diagram should be interpreted in conjunction with the exemplary architecture shown in FIG. 1. Although various terminals are utilized in this example, it will be understood that the terminals used by the calling and called parties could be any type of end-user device supported by a respective access system.

FIGS. 2-5 depict an embodiment of customized ring back in a cable network according to the present method the embodiment of the present method applies to networks that may, for example, conform to CableLabs PacketCable™ 1.5 Specifications. However, this method can be suitably modified by those skilled in the arts to apply to other cable network as well, and hence the method should not be considered to apply only to networks conforming to the CableLabs specifications. The method is implemented with a calling party endpoint device (calling terminal) 200, a $CMS_T$ 202, a ring back on application and associated content executing on a suitable hardware/middleware platform (henceforth denoted as MRB) 204, and a called party's endpoint device (called terminal) 206.

This embodiment of the present method has the following steps:

1) For a call from the calling terminal to the called terminal, the call is routed to the $CMS_T$, per normal cable call flow procedures. The $CMS_T$ receives an INVITE message for the call that includes a SDP of the calling terminal. The calling terminal may be any type of terminal, and the called terminal may be a cable MRB subscriber, homed at the $CMS_T$. The CMS that homes the MRB subscriber may have a termination attempt trigger (TAT) [or equivalent "initial filter criteria" as is commonly used in IMS networks] provisioned for the called terminal, with the MRB as the address to send the SIP messages to for calls from any calling party addresses except for calls that originate from addresses associated with the MRB application 2) The call hits the TAT trigger of the called terminal, and the $CMS_T$ sends the INVITE to the MRB application. The INVITE includes the SDP of the calling party.

3) The MRB application, based on a service profile of the called terminal and the parameters received in the INVITE (which include the calling and called party identification), determines that the calling terminal should receive MRB RBT for this call. The MRB thus responds to the INVITE with a 183 Session Progress message that includes early media parameters. If the MRB application determines that normal switch ring back tone should be given to the calling terminal for this call, the MRB application responds with a 180 Ringing message instead of the 183 Session Progress. The call flow continues, except that the eMTA, of the calling terminal, now provides the normal ring back tone to the calling terminal per normal cable call processing operations.

4) The $CMS_T$ passes the 183 Session Progress message, including the early media parameters, to the calling party via a $CMS_O$. This message indicates to the calling party that generation of local ringing is not required for the current call.

5-6) The $CMS_O$ acknowledges the 183 message with a PRACK that is routed back to the MRB application via the $CMS_T$. Note that this assumes that the INVITE received by $CMS_T$ in step 1 contains a "100rel" header as a Required header to impart reliability on provisional responses (such as those that are 1xx messages). In case 100rel is not sent as a Required header, this step is not necessary.

7-8) The MRB application acknowledges the PRACK with a 200 OK that is routed back to the $CMS_O$ via the $CMS_T$. Similarly, this step is required only if the INVITE sent in step 1 of the call flow mentions 100rel as a Required header.

9) The MRB application now initiates a new call to the called terminal. The MRB application sends a SIP INVITE to the $CMS_T$ that includes a SDP of the calling terminal (that was received in Step 2).

10) The $CMS_T$ completes the new call to called terminal using normal cable call processing procedures, using NCS signaling. Since this new call was originated by the MRB application, the new call does not hit the TAT trigger in the $CMS_T$.

11) The called terminal now "rings", and this is indicated to the $CMS_T$ via NCS signaling.

12) The $CMS_T$ provides the ringing indication to the MRB application via the 180 Ringing message, including the SDP of the called terminal.

13) The MRB application now sends the MRB RBT as a RTP stream to the address and port indicated in the SDP of the calling terminal. The MRB RBT may now be heard at the calling terminal.

14) Answering of the call at the called terminal is indicated via NCS signaling to the $CMS_T$.

15) The $CMS_T$ provides the answer indication to the MRB application as a 200 OK message.

16-17) The MRB application updates the calling terminal with the SDP of the called terminal (received in Step 12), using an UPDATE message. This results in a re-sync of session-related parameters (portmap and codecs).

18-19) The UPDATE is acknowledged by the calling terminal with a 200 OK.

20-21) The MRB application removes the MRB RBT and responds to the initial INVITE (received in Step 2) with a 200 OK which is returned to the $CMS_O$.

22) After interacting with the calling terminal to commit network resources for the bearer, the $CMS_O$ acknowledges the 200 OK with an ACK to the $CMS_T$.

23-25) The 200 OK is conveyed to the called terminal.

26) The call is cut thru, via an RTP bearer path between the calling terminal and the called terminal. A talk path is thus established between the calling terminal and the called terminal.

27-34) When the calling party hangs up, the call is terminated, with a BYE followed by an ACK. In a similar fashion, though not shown in the figure, the call can be terminated by the called party hanging up first. In this latter case, the BYE gets initiated by B's Endpoint Device to the $CMS_T$.

Although exemplary implementations of the invention have been depicted and described in detail herein, it will be apparent to those skilled in the art that various modifications, additions, substitutions, and the like can be made without departing from the spirit of the invention. For example, certain steps may be arranged in a different order as long as the desired overall functionality is maintained. Various architectural elements can be combined into a single element if convenient or desired. For example, responsibility for performing a function by certain element may be transferred to other elements. Similarly, the functionality provided on a single element can be spread out on two or more elements so a function decomposition across these elements can provide the desired solution. The embodiment of the present invention may be implemented in software and/or a combination of software and hardware. Therefore, such methods of the embodiments of the present invention can be stored on a computer readable medium or transmission carrier.

The scope of the invention is defined in the following claims.

We claim:

1. A method, comprising:
   placing a call from a calling terminal to a called terminal in a cable telecommunication network, and communicating with a ring back application;
   initiating a new call by the ring back application to the called terminal via a call management server;
   ringing the called terminal by the call management server and providing an indication of the ringing to the ring back application; and
   sending, by the ring back application, a predetermined ring back signal to the calling terminal during a ringing phase of the call.

2. The method according to claim 1, wherein in the step of initiating a new call by the ring back application to the called terminal via a call management server, the ring back application sends a SIP INVITE to the call management server including a session description protocol for the calling terminal.

3. The method according to claim 1, wherein the call management server completes the call to the called terminal using cable call processing procedures.

4. The method according to claim 3, wherein the cable call processing procedures use NCS (network call signaling).

5. The method according to claim 4, wherein the call does not hit a TAT (terminating attempt trigger) in the call management server, since the call was originated by the ring back application.

6. The method according to claim 1, wherein in the step of ringing the called terminal by the call management server and providing an indication of the ringing to the ring back application, ringing of the called terminal is indicated to the call management server via NCS (network call signaling).

7. The method according to claim 1, wherein in the step of ringing the called terminal by the call management server and providing an indication of the ringing to the ring back application, the call management server provides an indication of the ringing to the ring back application via a 180 Ringing message, including a Session Description Protocol of the called terminal.

8. The method according to claim 1, wherein in the step of sending, by the ring back application, a predetermined ring back signal to the calling terminal, the ring back application sends the predetermined ring back signal as a RTP (real time protocol) stream to an address and port indicated in the session description protocol of the calling terminal based on the indication of the ringing state of the called party received by the ring back application.

9. The method according to claim 1, wherein the method further comprises indicating to the call management server an answering of the call at the called terminal via NCS (network call signaling).

10. An apparatus, comprising:
    means for placing a call from a calling terminal to a called terminal in a cable telecommunication network, and communicating with a ring back application;
    means for initiating a new call leg by the ring back application to the called terminal via a call management server;
    means for ringing the called terminal by the call management server and providing an indication of the ringing to the ring back application; and
    means for sending, by the ring back application, a predetermined ring back signal to the calling terminal during a ringing phase of a call.

11. The apparatus according to claim 10, wherein the ring back application sends a SIP INVITE to the call management server including a session description protocol for the calling terminal.

12. The apparatus according to claim 10, wherein the call management server completes the call to the called terminal using cable call processing procedures.

13. The apparatus according to claim 12, wherein the cable call processing procedures use NCS (network call signaling).

14. The apparatus according to claim 13, wherein the new call does not hit a TAT (terminating attempt trigger) in the call management server, since the call was originated by the ring back application.

15. The apparatus according to claim 10, wherein ringing of the called terminal is indicated to the call management server via NCS (network call signaling).

16. The apparatus according to claim 10, wherein the call management server provides an indication of the ringing to the ring back application via a 180 Ringing message, including a Session Description Protocol of the called terminal.

17. The apparatus according to claim 10, wherein the ring back application sends the predetermined ring back signal as a RTP (real time protocol) stream to an address and port indicated in the session description protocol of the calling terminal.

18. The apparatus according to claim 10, wherein the apparatus further comprises means for indicating to the call management server an answering of the call at the called terminal via NCS (network call signaling).

19. A method, comprising:
    placing a call from a calling terminal to a called terminal in a cable telecommunication network, and communicating with a ring back application;
    initiating a new call leg by the ring back application to the called terminal via a call management server using a SIP INVITE that has a session description protocol for the calling terminal, the new call not hitting a TAT (terminating attempt trigger) in the call management server, since the new call was originated by the ring back application;
    ringing the called terminal by the call management server and providing an indication of the ringing to the ring back application via a 180 ringing message, including a session description protocol of the called terminal, during a ringing phase of the call; and sending, by the ring back application, a predetermined ring back signal to the calling terminal, wherein no new charges are incurred during the ringing phase.

20. The method according to claim 19, wherein, upon answering by the called terminal, the ring back application updates the calling terminal with the session description protocol that was received from the called terminal.

21. The method according to claim 19, wherein upon receipt of an ACK (acknowledgement) from the calling terminal to an update message, the ring back application stops the predetermined ring back signal, and also conveys the ACK to the called terminal so that path bearer path cut-thru between the calling terminal and the called terminal Occurs.

22. The method according to claim 19, wherein when the calling or called terminal hangs up, the call is terminated with a BYE and OK between the calling and called terminals per normal cable call flow, wherein the ring back application relays these messages between the calling and called terminal's CMS equipment (CMS( ) and $CMS_T$) to ensure proper call tear down per normal cable telecommunication call processing procedures.

23. The method according to claim 22, wherein the CMS( ) and $CMS_T$ communicate information using CMSS protocol.

* * * * *